United States Patent [19]  [11] 3,945,838
Erickson et al.  [45] Mar. 23, 1976

[54] GLASS COMPOSITIONS AND THEIR FIBERS

[75] Inventors: Thomas D. Erickson, Newark; Warren W. Wolf, Reynoldsburg, both of Ohio

[73] Assignee: Owens-Corning Fiberglas Corporation, Toledo, Ohio

[22] Filed: Aug. 12, 1974

[21] Appl. No.: 496,485

[52] U.S. Cl. .................................... 106/50; 106/52
[51] Int. Cl.$^2$ ........................................ C03C 13/00
[58] Field of Search ............................... 106/50, 52

[56] References Cited
UNITED STATES PATENTS

| | | | |
|---|---|---|---|
| 3,013,888 | 12/1961 | de Lajarte | 106/50 |
| 3,513,002 | 5/1970 | Labino | 106/50 |
| 3,607,322 | 9/1971 | Brady | 106/50 |
| 3,840,379 | 10/1974 | Wolf | 106/50 |
| 3,841,882 | 10/1974 | Wolf | 106/50 |
| 3,847,627 | 11/1974 | Erickson | 106/50 |

*Primary Examiner*—Douglas Winston A.
*Assistant Examiner*—John F. Niebling
*Attorney, Agent, or Firm*—John W. Overman; Patrick P. Pacella

[57] ABSTRACT

We disclose glass compositions having an index of refraction of about 1.550 in the fiber form. Textile glass fibers formed from these glass compositions are especially useful for the reinforcement of clear plastics.

12 Claims, No Drawings

GLASS COMPOSITIONS AND THEIR FIBERS

This invention relates to fiberizable glass compositions. More specifically, this invention relates to textile glass fibers.

We often use textile glass fibers for the reinforcement of plastics. Commercially available textile glass fibers for this purpose are E-glass and S-glass filaments. Recently, we developed a fiberizable glass composition in which we eliminated the potential pollutants boron and fluorine. The fibers formed from this glass composition compare favorably with E-glass in color, liquidus temperature, and viscosity.

The index of refraction (1.576) of this glass composition, however, is too high for the reinforcement of clear plastics. That index should be about 1.550.

We now have developed glass compositions which have an index of refraction of about 1.550 in the fiber form. These glasses are boron and fluorine free and compare favorably with E-glass in color, liquidus temperature, and viscosity.

The boron and fluorine freed glasses of this invention have the following compositions and ranges:

| Ingredients | Weight Percent |
|---|---|
| $SiO_2$ | 66.0 to 67.0 |
| CaO | 10.0 to 11.0 |
| $Na_2O$ | 14.5 to 15.5 |
| $ZrO_2$ | 7.5 to 8.5 |
| | |
| $SiO_2$ | 59.0 to 60.0 |
| $Al_2O_3$ | 17.5 to 18.5 |
| CaO | 9.0 to 10.0 |
| MgO | 8.5 to 9.5 |
| $Na_2O$ | 0 to 1.0 |
| $Li_2O$ | 3.0 to 4.0 |
| | |
| $SiO_2$ | 56.5 to 57.5 |
| $Al_2O_3$ | 7.5 to 8.5 |
| CaO | 8.5 to 9.5 |
| MgO | 2.0 to 3.0 |
| ZnO | 6.0 to 7.0 |
| $Na_2O$ | 14.5 to 15.5 |
| $ZrO_2$ | 1.5 to 2.5 |

All of these glass compositions can contain trace or small amounts of materials such as $Fe_2O_3$ or $TiO_2$. These amounts are due to impurities in the batch ingredients. Generally, these amounts are less than 0.1 weight percent.

Present technology allows for the production of glass fibers having a diameter ranging from 0.0001 inch to 0.0004 inch at a rate of 10,000 feet to 15,000 feet per minute. Glass fibers are produced from small streams of molten glass which exude through tiny orifices located in what is called a bushing. Typically, bushings have 204 such orifices. The tiny streams of molten glass which issue from the bushing are attenuated by pulling the fibers until the diameters given above result. During this time the streams cool and rigidify into what are called filaments.

The filaments then are coated with various sizings, silanes, lubricants, and the like and brought together to form a strand and coiled upon a spool to form a package. In another embodiment, the coated glass fibers can be routed directly to a chopping apparatus, thereby eliminating the collection package. The chopped strands can be dried prior to or subsequent to chopping. When the strands are gathered onto a collection package, the package is dried prior to positioning the package on a creel with numerous other packages. In another embodiment, the coating can be applied to the glass fibers after the strands or roving are formed rather than applying the coating to the filaments.

The following examples describe specific glass compositions embodying the principles of this invention.

Table

| Ingredients | Example, Weight Percent | | |
|---|---|---|---|
| | 1 | 2 | 3 |
| $SiO_2$ | 66.4 | 59.5 | 57.0 |
| $Al_2O_3$ | — | 17.8 | 8.1 |
| CaO | 10.8 | 9.6 | 8.9 |
| MgO | — | 9.1 | 2.6 |
| ZnO | — | — | 6.5 |
| $Na_2O$ | 14.9 | 0.5 | 14.8 |
| $Li_2O$ | — | 3.3 | — |
| $ZrO_2$ | 7.9 | — | 2.0 |
| $Fe_2O_3$ | | 0.07 | 0.04 |
| $TiO_2$ | | 0.05 | 0.03 |
| Liquidus Temperature, °F | 1940 | 2190 | 2000 |
| Viscosity Temperature, °F at Log Poise 2.50 | 2362 | 2385 | 2295 |
| Refractive Index | 1.548 | 1.550 | 1.544 |

The glasses of this invention have a liquidus temperature of 2200° F or less and a viscosity of log poise 2.50 at 2450° F or less. These glasses therefore are suitable for fiber forming and direct replacement of E-glass and other textile glass fibers formed from glasses containing boron and fluorine. In addition, these glass compositions have an index of refraction of about 1.550 in the fiber form. This index makes the glass fibers of this invention especially well suited for the reinforcement of clear plastics. These glasses also compare favorably with E-glass in color, liquidus, and viscosity. Clear plastic panels and clear plastic fishing rods are examples of products which these fibers can reinforce.

We intend to include modifications and variations within the scope and spirit of this invention.

We claim:

1. A fiberizable, boron and fluorine free glass composition having a liquidus temperature of 2200° F or less, having a viscosity of log 2.5 poises at 2450° F or less and having an index of refraction of about 1.550 in the fiber form, consisting essentially by weight of:

| Ingredients | Weight Percent |
|---|---|
| $SiO_2$ | 66.0 to 67.0 |
| CaO | 10.0 to 11.0 |
| $Na_2O$ | 14.5 to 15.5 |
| $ZrO_2$ | 7.5 to 8.5 |

2. A glass composition according to claim 1 consisting essentially by weight of:

| Ingredients | Weight Percent |
|---|---|
| $SiO_2$ | 66.4 |
| CaO | 10.8 |
| $Na_2O$ | 14.9 |
| $ZrO_2$ | 7.9 | and having an index of refraction of 1.548.

3. A fiberizable, boron and fluorine free glass composition having a liquidus temperature of 2200° F or less, having a viscosity of log 2.5 poises at 2450° F or less and having an index of refraction of about 1.550 in the fiber form, consisting essentially by weight of:

| Ingredients | Weight Percent |
|---|---|
| SiO$_2$ | 59.0 to 60.0 |
| Al$_2$O$_3$ | 17.5 to 18.5 |
| CaO | 9.0 to 10.0 |
| MgO | 8.5 to 9.5 |
| Na$_2$O | 0 to 1.0 |
| Li$_2$O | 3.0 to 4.0. |

4. A glass composition according to claim 3 consisting essentially by weight of:

| Ingredients | Weight Percent |
|---|---|
| SiO$_2$ | 59.5 |
| Al$_2$O$_3$ | 17.8 |
| CaO | 9.6 |
| MgO | 9.1 |
| Na$_2$O | 0.5 |
| Li$_2$O | 3.3 | and having an index of refraction of 1.550.

5. A fiberizable, boron and fluorine free glass composition having a liquidus temperature of 2200° F or less, having a viscosity of log 2.5 poises at 2450° F or less and having an index of refraction of about 1.550 in the fiber form, consisting essentially by weight of:

| Ingredients | Weight Percent |
|---|---|
| SiO$_2$ | 56.5 to 57.5 |
| Al$_2$O$_3$ | 7.5 to 8.5 |
| CaO | 8.5 to 9.5 |
| MgO | 2.0 to 3.0 |
| ZnO | 6.0 to 7.0 |
| Na$_2$O | 14.5 to 15.5 |
| ZrO$_2$ | 1.5 to 2.5. |

6. A glass composition according to claim 5 consisting essentially by weight of:

| Ingredients | Weight Percent |
|---|---|
| SiO$_2$ | 57.0 |
| Al$_2$O$_3$ | 8.1 |
| CaO | 8.9 |
| MgO | 2.6 |
| ZnO | 6.5 |
| Na$_2$O | 14.8 |
| ZrO$_2$ | 2.0 | and having an index of refraction of 1.544.

7. A boron and fluorine free textile glass fiber having an index of refraction of about 1.550 and consisting essentially by weight of:

| Ingredients | Weight Percent |
|---|---|
| SiO$_2$ | 66.0 to 67.0 |
| CaO | 10.0 to 11.0 |
| Na$_2$O | 14.5 to 15.5 |
| ZrO$_2$ | 7.5 to 8.5. |

8. A glass fiber according to claim 7 consisting essentially by weight of:

| Ingredients | Weight Percent |
|---|---|
| SiO$_2$ | 66.4 |
| CaO | 10.8 |
| Na$_2$O | 14.9 |
| ZrO$_2$ | 7.9 | and having an index of refraction of 1.548.

9. A boron and fluorine free textile glass fiber having an index of refraction of about 1.550 and consisting essentially by weight of:

| Ingredients | Weight Percent |
|---|---|
| SiO$_2$ | 59.0 to 60.0 |
| Al$_2$O$_3$ | 17.5 to 18.5 |
| CaO | 9.0 to 10.0 |
| MgO | 8.5 to 9.5 |
| Na$_2$O | 0 to 1.0 |
| Li$_2$O | 3.0 to 4.0. |

10. A glass fiber according to claim 9 consisting essentially by weight of:

| Ingredients | Weight Percent |
|---|---|
| SiO$_2$ | 59.5 |
| Al$_2$O$_3$ | 17.8 |
| CaO | 9.6 |
| MgO | 9.1 |
| Na$_2$O | 0.5 |
| Li$_2$O | 3.3 | and having an index of refraction of 1.550.

11. A boron and fluorine free textile glass fiber having an index of refraction of about 1.550 and consisting essentially by weight of:

| Ingredients | Weight Percent |
|---|---|
| SiO$_2$ | 56.5 to 57.5 |
| Al$_2$O$_3$ | 7.5 to 8.5 |
| CaO | 8.5 to 9.5 |
| MgO | 2.0 to 3.0 |
| ZnO | 6.0 to 7.0 |
| Na$_2$O | 14.5 to 15.5 |
| ZrO$_2$ | 1.5 to 2.5. |

12. A glass fiber according to claim 11 consisting essentially by weight of:

| Ingredients | Weight Percent |
|---|---|
| SiO$_2$ | 57.0 |
| Al$_2$O$_3$ | 8.1 |
| CaO | 8.9 |
| MgO | 2.6 |
| ZnO | 6.5 |
| Na$_2$O | 14.8 |
| ZrO$_2$ | 2.0 | and having an index of refraction of 1.544.

* * * * *